United States Patent
Bauman et al.

(10) Patent No.: US 7,866,456 B2
(45) Date of Patent: Jan. 11, 2011

(54) PORTABLE SELF-CONTAINED SCREW CONVEYOR

(75) Inventors: Donald R. Bauman, Climax, MI (US); Brent D. Root, Kalamazoo, MI (US)

(73) Assignee: Hapman, Inc., Kalamazoo, MI (US)

( * ) Notice: Subject to any disclaimer, the term of this patent is extended or adjusted under 35 U.S.C. 154(b) by 531 days.

(21) Appl. No.: 11/982,652

(22) Filed: Nov. 2, 2007

(65) Prior Publication Data
US 2009/0114504 A1    May 7, 2009

(51) Int. Cl.
B65G 21/12 (2006.01)
B65G 41/00 (2006.01)

(52) U.S. Cl. ........................ 198/311; 198/312; 198/315

(58) Field of Classification Search ................. 198/300, 198/311, 312, 315
See application file for complete search history.

(56) References Cited

U.S. PATENT DOCUMENTS

| | | | | | |
|---|---|---|---|---|---|
| 2,844,240 | A | * | 7/1958 | Buck ....................... | 198/308.1 |
| 2,912,095 | A | * | 11/1959 | Palmer et al. ............ | 198/316.1 |
| 4,030,593 | A | * | 6/1977 | Deboffles ................ | 198/308.1 |
| 4,512,687 | A | * | 4/1985 | Enns ........................... | 406/41 |
| 4,714,149 | A | * | 12/1987 | Tiede ......................... | 198/312 |
| 4,730,742 | A | * | 3/1988 | Feterl ......................... | 212/299 |
| 4,739,868 | A | * | 4/1988 | Head ....................... | 198/316.1 |
| 4,989,716 | A | * | 2/1991 | Stuckey ..................... | 198/311 |
| 5,230,419 | A | * | 7/1993 | Millard ..................... | 198/668 |
| 5,305,866 | A | * | 4/1994 | Stewart et al. ............. | 198/311 |
| 5,404,993 | A | * | 4/1995 | Scarrow ................. | 198/550.2 |
| 6,588,572 | B2 | * | 7/2003 | Lischynski et al. .......... | 198/317 |
| 6,971,324 | B1 | * | 12/2005 | Beck .......................... | 111/200 |

* cited by examiner

Primary Examiner—Douglas A Hess
(74) Attorney, Agent, or Firm—Olson & Cepuritis, Ltd.

(57) ABSTRACT

A portable screw conveyor includes a conveyor boom assembly carrying a conveyor and supported by a portable base having wheels located at each corner of the base which provides support for the conveyor boom assembly. An actuator system preferably with a linear actuator, is provided between the conveyor boom assembly and the portable base to raise and lower one end of the conveyor boom assembly. A conveyor boom assembly preferably carries a flexible screw conveyor.

8 Claims, 3 Drawing Sheets

PORTABLE SELF-CONTAINED SCREW CONVEYOR

FIELD OF THE INVENTION

The present invention relates to portable screw conveyors that are self-contained.

BACKGROUND OF THE INVENTION

Screw conveyors have long been known in the material handling art. Generally, such conveyors have the capability of transporting a wide variety of materials, usually between predetermined starting and ending points, with the ending point frequently located higher than the starting point. Special considerations must be given to conveyor facilities that are used in a sanitary environment. Examples are found in conveyor systems used in the food industry for preparation and handling of food products, and in the manufacture of pharmaceutical products and other products which are eventually consumed or come into contact with human end users. These conveyor systems must typically meet stringent sanitary requirements, typically requiring daily or other frequent take down and cleaning. At times, successive products carried by a conveyor even if sanitary, may be incompatible with one another or otherwise produce undesired results if residue from one product is allowed to come into contact with another product carried by the same conveyor system.

Portable conveyors, especially those used in a sanitary environment present additional challenges to be overcome. For example, portable conveyors may be desired for temporary or intermittent use for a given job, and upon relocation to a different work site may be used to handle a different material. For example, a portable conveyor system may be desired for use in the food preparation industry where large quantities suitable for industrial manufacture are mixed together for different batches of the same or similar products, or for different, unrelated products. Not only must the conveyor equipment be readily maintainable for sanitation purposes, the equipment must also be as free as possible from contamination caused by inadvertent contact with the surrounding environment. For these and other reasons, it is often desirable to provide a conveyor system that is self-contained, thereby reducing the need for external power sources, drive equipment and the like which may introduce contamination and other problems that are unique to operation in a sanitary environment.

SUMMARY OF THE INVENTION

The present invention provides a novel and improved portable conveyor that minimizes the disadvantages associated with the prior art machines and systems, and provides advantages in construction, mode of operation and use. A portable screw conveyor embodying the present invention comprises a conveyor boom assembly that includes a conveyor having an inlet end and a discharge end, along with a unitary monolithic portable base and an actuator system between the conveyor boom assembly and the portable base to raise and lower the discharge end of the conveyor as well as the conveyor boom assembly so as to impart a range of motion thereto. The portable base cooperates with the actuator system to support the conveyor boom assembly throughout its range of motion. The portable base is rigid and may include a plurality of wheels about which the portable conveyor can be rolled. Two pivot assemblies support the conveyor boom assembly. One pivot assembly includes articulated arms that are rigidly connected to the conveyor boom assembly and to the portable base. The other pivot assembly includes an arm rigidly connected to the conveyor boom assembly and pivotably connected to an actuator supported by the portable base.

The actuator system is located between the conveyor boom assembly and the portable base, and the pivot assemblies are spaced from one another. The pivot assembly having articulated arms is attached directly to the structural support member. The arms of the other pivot assembly are attached to the boom assembly and pivotably to the actuator which, in turn is attached to the structural support member. The actuator is movable between first and second positions to raise and lower the discharge end of the conveyor so as to impart a range of motion thereto. The portable base cooperates with the actuator system to support the conveyor boom assembly throughout its range of motion.

The actuator system preferably includes a linear actuator movable between extended and retracted positions to raise and lower the discharge end of the conveyor. The portable base cooperates with the actuator system to support the conveyor boom assembly throughout its range of motion.

DESCRIPTION OF PREFERRED EMBODIMENT

Figure 1:
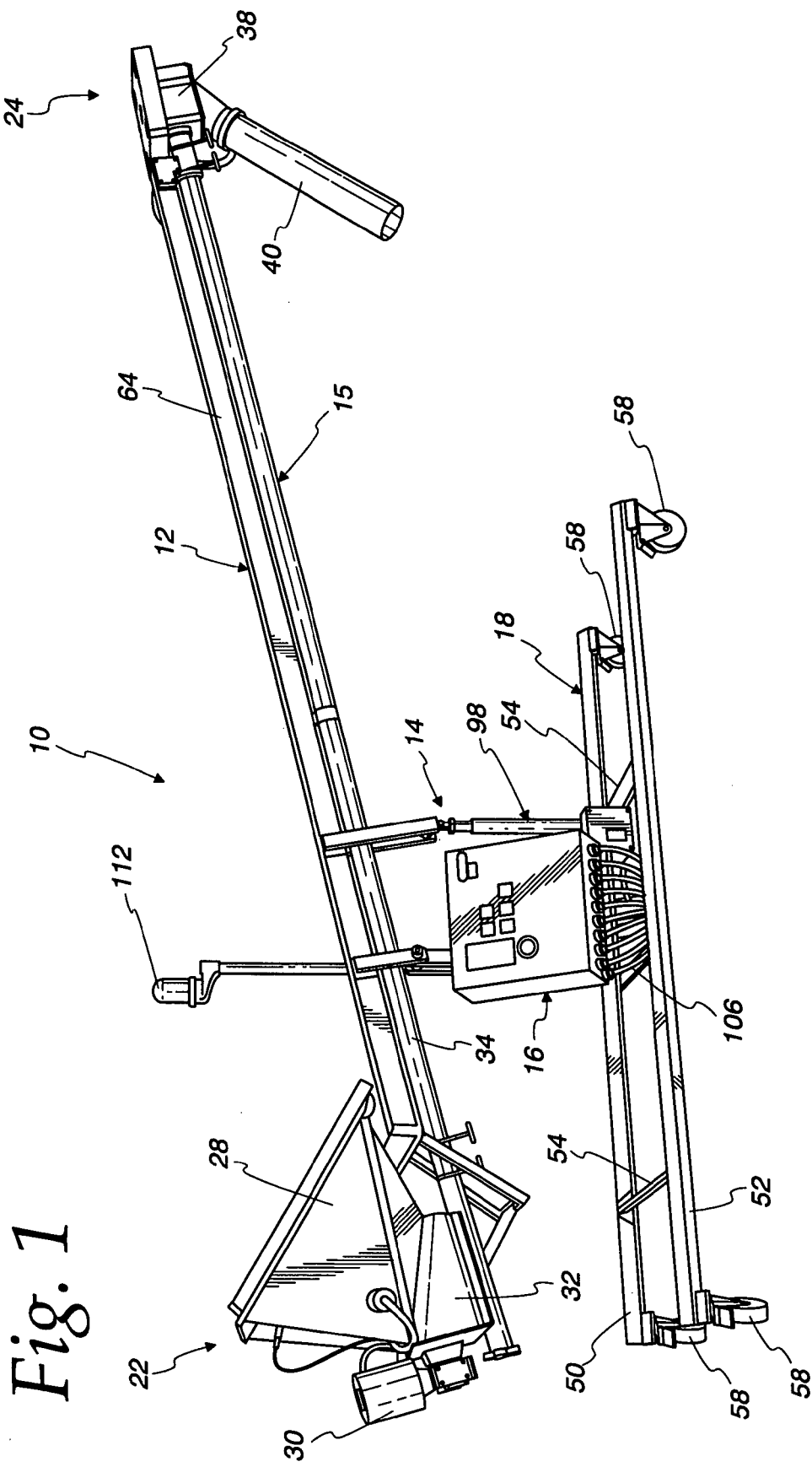
FIG. 1. is a schematic perspective view of a portable screw conveyor embodying the present invention.

The invention disclosed herein is, of course, susceptible of embodiment in many different forms. Shown in the drawings and described herein below in detail is a preferred embodiment of the invention. The present disclosure, however, is an exemplification of the principles of the invention and does not limit the invention to the illustrated embodiment. For ease of description, a portable screw conveyor embodying the present invention is described herein below in its usual assembled position as shown in the accompanying drawings, and terms such as upper, lower, horizontal, longitudinal, etc., may be used herein with reference to this usual position. The screw conveyor may be manufactured, transported, sold, or used in orientations other than that described and shown herein.

Referring to FIGS. 1-4, the apparatus embodying the present invention provides a screw conveyor generally indicated at 10 and including a conveyor boom assembly generally indicated at 12, an actuator assembly generally indicated at 14, a control system generally indicated at 16 and a unitary portable base generally indicated at 18. As described herein, the conveyor boom assembly 12 is described as employing a flexible screw conveyor system, as is known in the art. However, virtually any type of conveyor system known today can be used, as well. For example, belted, flighted conveyors, link conveyors etc. could also be employed, if desired, utilizing the present invention.

Figure 4:
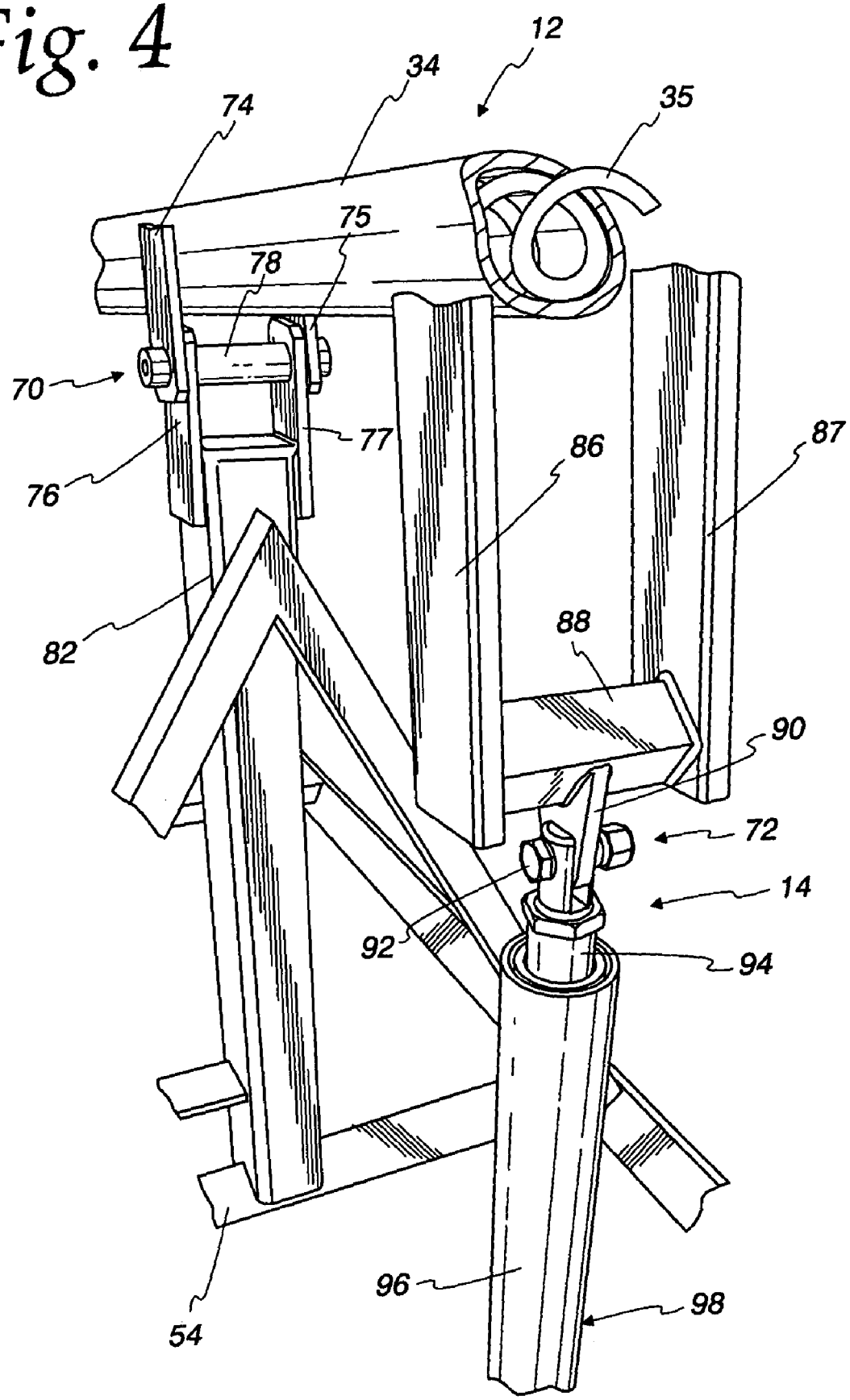
FIG. 4 is a fragmentary perspective view of the actuator system.

The conveyor boom assembly 12 includes boom 64 and conveyor 15 that has an inlet end generally indicated at 22 and an outlet or discharge end generally indicated at 24. Included at inlet end 22 is a hopper 28 that preferably contains a delumper (not shown) to reduce in size relatively larger solids that are poured or otherwise loaded into hopper 28. The delumper is driven by an electric motor 30. The material contained in hopper 28 exits a chute 32 so as to enter a casing or housing 34 which contains an auger 35 (FIG. 4). The auger may be driven at virtually any point along its length, but preferably is driven by an electric motor 25 located at discharge end 24.

In the embodiment illustrated, material carried by the conveyor by action of the auger within housing 34 is discharged at distal end 38, of casing 34 so as to enter the discharge chute 40. The conveyor boom assembly 12 can be made to virtually any length desired and the screw conveyor 10 may be made to virtually any scale desired. However, in the preferred embodiment, portable screw conveyor 10 is made to a scale such that, with the conveyor boom assembly fully lowered, the discharge end 24 is approximately at or below the shoulder height of an individual operator charged with maintaining or cleaning the portable screw conveyor. Accordingly, in a preferred embodiment, the portable screw conveyor 10 can be fully lowered so as to pass conveniently between interior doorways and hallways of conventional production facilities, often times passing through doorways, hallways and other passages originally designed only for human traffic. With the portable base 18, the portable screw conveyor 10 can be quickly and easily relocated from one work site to another within a production facility and thus offers economies of operation to help reduce the operating expenses of a production facility.

Portable base 18, as shown in the preferred embodiment, includes a pair of elongated structural members 50, 52 joined together by lateral members 54 so as to form a single unitary base construction. The portable base 18 includes wheels 58 that cooperate with the structural members of the base to provide a single point of support for the conveyor boom assembly 12, actuator system 14 and control system 16. Accordingly, portable screw conveyor 10 is completely self-contained to allow for a rapid relocation from one work site to another. However, in applications where contamination is not a problem, external power sources for the conveyor drive and actuator systems, for example, can be employed, if desired.

It is generally preferred that the conveyor mechanism employed have a lightweight configuration such as a flat wire or round wire flexible screw conveyor configuration. However, other types of conveyor configurations such as augers constructed of plastic or aluminum or other lightweight materials could also be employed. As indicated in FIG. 1, for example, the conveyor mechanism and its enclosing casing 34 are supported throughout their entire length by a support beam 64 that may, for example, have a hollow box configuration or an I-beam configuration so as to be relatively rigid.

It is generally preferred that the portable screw conveyor 10 be lowered so that a service operator can reach virtually all components, especially components with the discharge end 24 without requiring a ladder, platform or other encumbrance. Accordingly, it is generally desirable that the support 64 be rigid enough so as to prevent substantial deflection of the conveyor boom assembly when brought to its lower most position, with the conveyor boom assembly located generally horizontal. Thus, with a preferred scaling of the portable screw conveyor 10, a service operator can readily walk along the lowered conveyor boom assembly, gaining quick and easy access to virtually any part or portion of the portable screw conveyor 10.

Referring now to FIG. 4 in particular, a conveyor boom assembly is shown with the boom 64 removed, for clarity. Conveyor casing 34 contains auger 35 and is shown in conjunction with actuator system 14 that includes linear actuator 98, a first or rearward pivot assembly generally indicated at 70, and a second or forward pivot assembly generally indicated at 72. Included in pivot assembly 70 are articulated upper and lower pivot arms 74, 75 and 76, 77 respectively, that are joined together by a pivot pin 78. The articulated pivot arms are supported by vertical column 82, and lateral member 54 of portable base 18. The upper ends of arms 74, 75 are secured to boom (FIG. 1) 64 with a rigid attachment such as a metallurgical joinder or bolt fasteners, for example.

Figure 2:
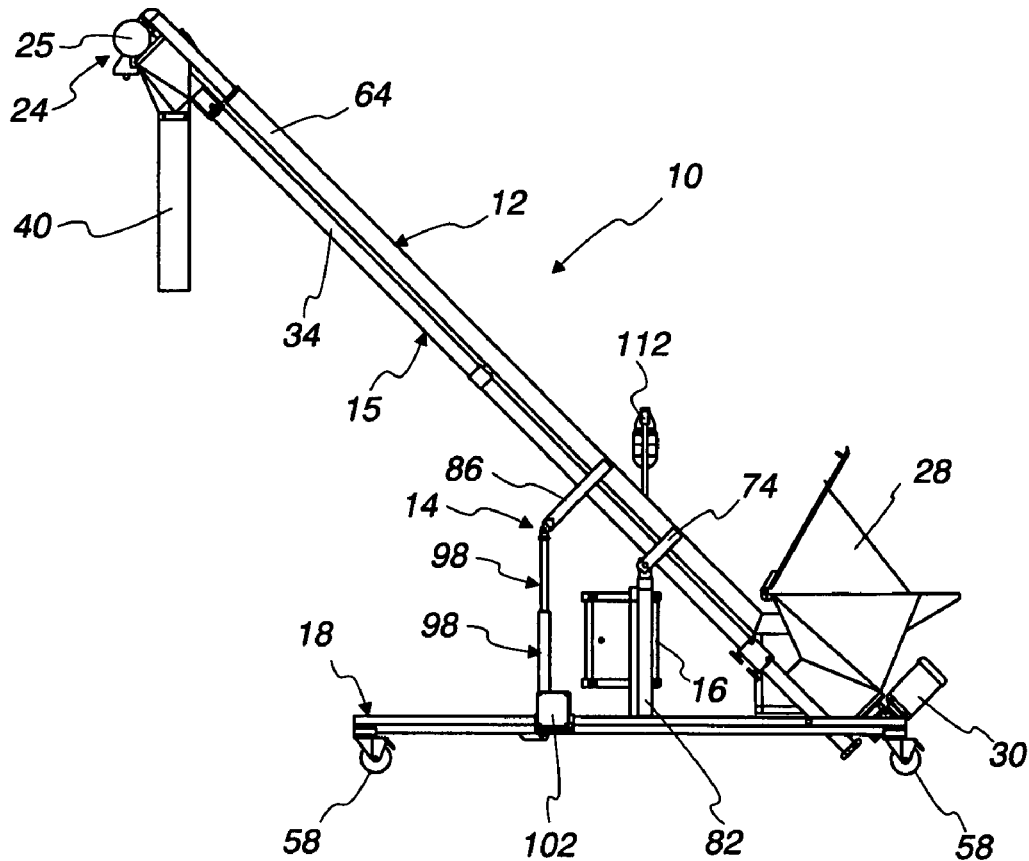
FIG. 2. is a side elevational view thereof with the conveyor boom in an elevated position.
Figure 3:
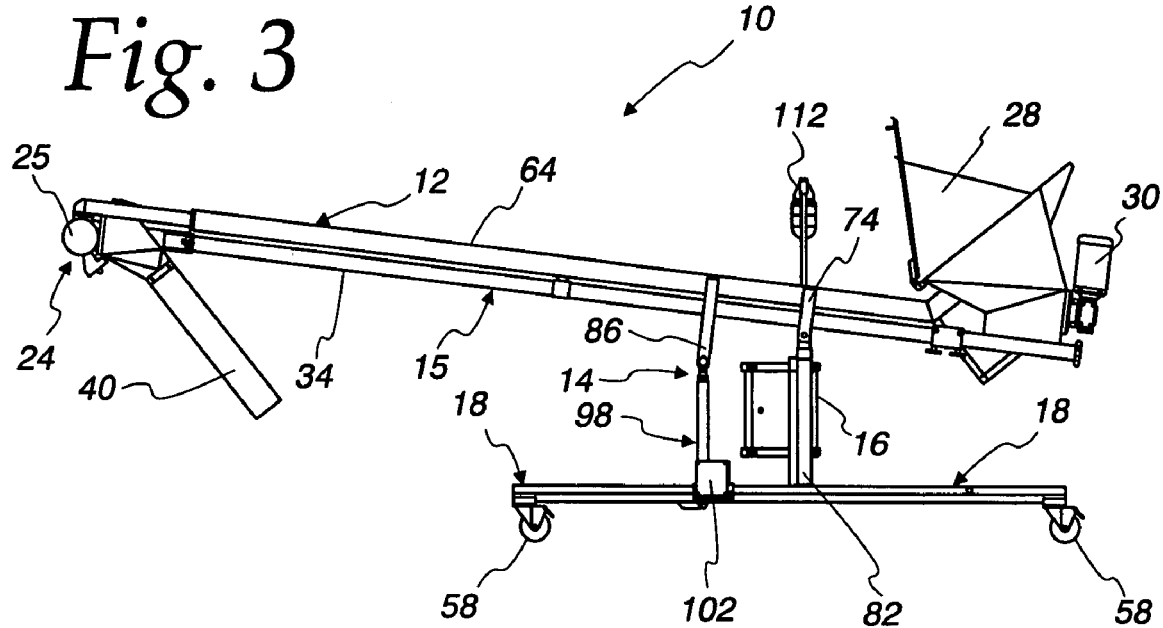
FIG. 3 is a side elevational view thereof with the boom conveyor in a lowered position.

The forward pivot assembly 72 includes a pair of parallel pivot arms 86, 87 joined at their lower ends by a cross member 88 supported by arm 90. The upper ends of arms 86, 87 are also preferably joined to structural member 64 with a rigid joinder, such as that provided by a metallurgical joinder or nut and bolt fasteners. Arm 90 is pinned at 92 to the actuator assembly at the upper end of a piston 94 linear actuator 98. The lower end of linear actuator housing 96 is pivotally connected at 102 to portable base 18 (FIGS. 2 & 3). Linear actuator 98 is operated in a known manner so as to cause the piston 94 to extend upwardly and raise the discharge end 24 of conveyor 15. Linear actuator 98 is operable as well to lower discharge end 24 in a controlled manner to virtually any intermediate height desired, such as the lower positions indicated in FIGS. 1 and 3.

In operation, by action of the actuator system the conveyor boom assembly can extend upwardly to an included angle of about 45 degrees relative to the ground. At the lowered position the conveyor boom assembly is at an included angle of about zero to about 10 degrees relative to the ground, preferably at about 5 to 7 degrees relative to the ground.

As can be seen in FIG. 4, the supports for conveyor boom assembly 12 preferably include three points of support, with two points of support at the rear pivot assembly 70 and a single point of support at the forward pivot assembly 72. This contributes to the inherent stability of the conveyor boom assembly, preventing distortion or relocation forces that might otherwise arise from unresolved forces generated by the screw conveyor drive. Accordingly, with the support assembly of the present invention, the discharge or free end of the chute 40 can be maintained at a precise predetermined location, as is necessary in many industrial applications. It is generally preferred that, for continued support and efficient transference of forces to the ground or floor, the portable base 18 preferably has four wheels located at the corners of a rectangle formed by the framework of the portable base 18. Thus, while the resulting three point pivot suspension of the conveyor boom assembly 12 by the pivot assemblies quickly adapts to maintain stability despite unresolved lateral forces, the load of the conveyor boom assembly is transferred to the portable base having four points of contact with the ground. This maintains the portable base steady despite lateral forces that may be transmitted to it through the actuator system.

The control system 16 is schematically indicated in FIG. 1 as contained within a single control housing having indicators and control inputs as may be desired. Also shown in FIG. 1 are a plurality of conduits 106 that connect the controls to the linear actuator 98 as well as to an external source of power (not shown). Control system 16 in the preferred embodiment, energize indicator light 112 located atop portable screw conveyor 10 to provide a visual warning to nearby personnel when the portable screw conveyor is in operation.

Control system 16 may operate with one or more types of different power systems. For example, control system 16 may operate exclusively on electrical power or compressed air or hydraulic fluid or combinations of these, as may be desired. Due to possible contamination issues and the need for more complicated maintenance, it is generally preferred that the control system 16 operate using electrical power and accordingly electrical connections are routed through the hollow structural members of portable base 18 so as to provide a connection to linear actuator 98 and to the electric motors at the ends of conveyor boom assembly 12.

As mentioned, it is generally preferred that four wheels be provided for portable base 18 and that these wheels be located at the corners of an imaginary rectangle, as can be seen from the figures. Thus, it is assumed in the illustrated embodiment that the portable screw conveyor 10 will be rolled over and supported by surfaces that are generally flat such that the four wheels generally make simultaneous contact with the floor, ground or other support surface. However, in many practical environments, a floor may be uneven and accordingly the present invention contemplates inclusion of any of a wide variety of known leveling devices to statically or dynamically adjust the vertical height of each wheel 58 relative to the ground. For example, each wheel can be supported by vertical shaft passing through the frame of portable base 18 with a clamp or other indexing device provided to lock the vertical wheel support at a desired position, that brings the wheel into constant contact with the ground. The vertical support could, for example, be as simple as a threaded shaft, a desired portion of which is secured by threaded nut fasteners to the corners of portable base 18. In extreme situations, each corner of support base 18 could be provided with independently operable linear actuators to raise or lower the wheels with respect to the corners of the portable base.

The foregoing description and the accompanying drawings are illustrative of the present invention. Still other variations and arrangements of parts are possible without departing from the spirit and scope of this invention.

What is claimed is:

1. A portable conveyor, comprising:
   a unitary monolithic portable base;
   a conveyor boom assembly pivotably mounted to the base by two pivot assemblies and carrying a conveyor having an inlet end and a discharge end;
   an actuator system operably connected to the conveyor boom assembly and the portable base to raise and lower the discharge end of the conveyor within a predetermined range of motion; and
   the portable base cooperating with the actuator system to support the conveyor boom assembly throughout the range of motion;
   one of said pivot assemblies including articulated arms one of which is rigidly connected to the conveyor boom assembly and another to the portable base, and the other of said pivot assemblies including an arm rigidly connected to the conveyor boom assembly and pivotably connected to the actuator system.

2. The portable conveyor according to claim 1 wherein the portable base is generally rigid and includes a plurality of wheels about which the portable conveyor can be rolled.

3. The portable conveyor according to claim 1 wherein the portable base has a generally rectangular configuration.

4. The portable conveyor according to claim 1 wherein the actuator system comprises a linear actuator.

5. The portable conveyor according to claim 1 wherein the conveyor is a screw conveyor.

6. The portable conveyor according to claim 1 wherein the conveyor is a flexible screw conveyor.

7. The portable conveyor according to claim 1 wherein the portable base has a generally rectangular configuration with four wheels mounted at its corners.

8. The portable conveyor according to claim 1 wherein the actuator system comprises a linear actuator pivotably mounted to the conveyor boom assembly.

* * * * *